July 16, 1968  K. B. TILBROOK  3,392,779
GLASS FIBER COOLING MEANS
Filed Oct. 3, 1966
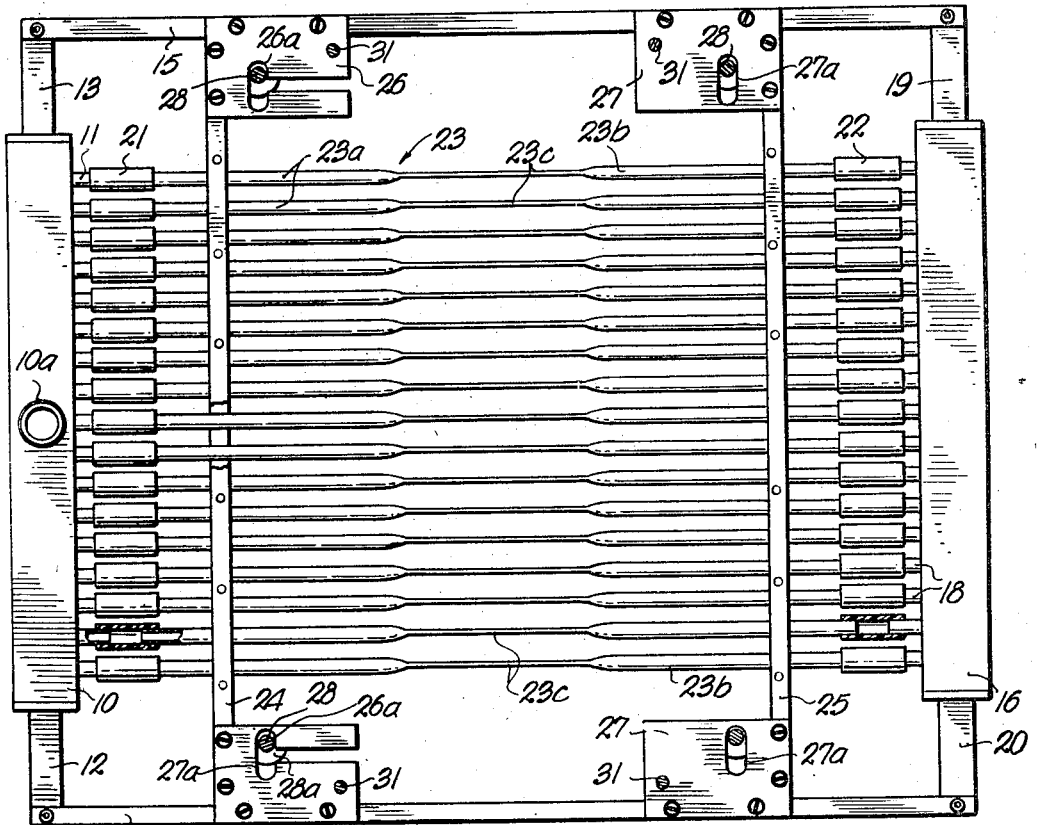
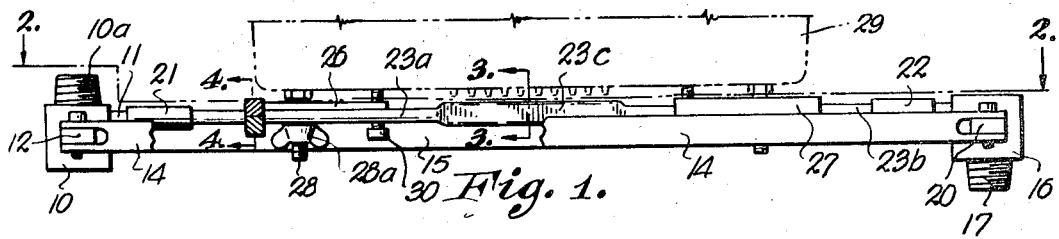
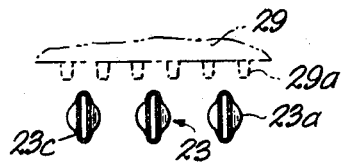
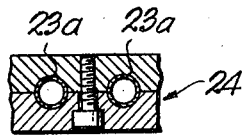
INVENTOR
Kenneth B. Tilbrook
BY Scofield, Kokjer, Scofield & Lowe
ATTORNEYS

United States Patent Office 3,392,779
Patented July 16, 1968

3,392,779
GLASS FIBER COOLING MEANS
Kenneth B. Tilbrook, Kansas City, Mo., assignor to Certain-Teed Products Corporation, Ardmore, Pa., a corporation of Maryland
Filed Oct. 3, 1966, Ser. No. 583,623
2 Claims. (Cl. 165—47)

This invention relates to means for cooling molten glass fibers being drawn from a bushing and refers more particularly to improvements in liquid carrying cooling tubes adapted for use adjacent the fiber drawing orifices of a bushing containing a supply of molten glass.

The U.S. patent to Russell 3,068,670 "Apparatus for Production of Glass Fibers," issued Dec. 18, 1962, shows the use of hollow, liquid carrying fiber cooling tubes associated with a bushing. The same is true of Phillips, 2,632,287, issued Mar. 24, 1953, for "Apparatus for Producing Fibrous Glass."

In the process of attenuating glass fibers, by drawing same from orifices located in the bottom of a bushing containing a supply of molten glass, it is desirable that the viscosity of the glass be low so that the rate of flow is maximized. Once a fiber has left the orifice, it is desirable that the viscosity thereof be high, so that the fiber will not break. Inasmuch as viscosity is an inverse function of the temperature, it is evident that the fiber should be rapidly cooled after it has left the orifice. The patents to Case 2,955,772, issued Oct. 11, 1964, "Textile Fiber Winder," Higgins, Jr., 3,022,020, issued Feb. 20, 1962 "Fiber Drawing Apparatus" and Stephens et al. 3,268,314 issued Aug. 23, 1966, "Apparatus for Detecting Breaks During Molten Fiber Formation" all disclose typical apparatus associated with operations involved fibers drawn from bushings.

To most advantageously accomplish the aforementioned immediate cooling of the fibers as they emerge from the bushing, applicant utilizes hollow tubes through which a cooling liquid such as water flows. These tubes, flattened in cross section are positioned closely below and adjacent the bushing lower surface and between sets of the orifices thereof from which the molten glass fibers are drawn. Typically, two rows of bushing orifices are located between each adjacent pair of tubes so that each newly formed glass fiber is adjacent to at least one tube and can lose heat to it by radiation. It has been proposed in the art to utilize, as fabrication metals for cooling tubes such as those instantly disclosed and/or solid fin type cooling devices copper, platinum, silver, aluminum, Monel, and nickel, as well as alloys of such metals. The art has alleged that such metals can perform satisfactorily. With respect to hollow, liquid filled cooling tubes, there is little question that they can successfully perform the cooling function fabricated from any of these or other metals. However, corrosion of such liquid carrying metal tubes creates serious problems. In the rigorous environment closely next the bushing undersurface, some of the constituents of the molten glass vaporize and later condense on the relatively cold heat exchange surfaces of the tubes. Among such are fluorine compounds such as calcium and sodium salts which react vigorously with most metals.

As noted, it is also conventional as may be seen in the Russell Patent 2,908,036, "Apparatus for Production of Glass Fibers," issued Oct. 13, 1959, to use solid cross section fin constructions as cooling means, same positioned closely adjacent and between the bushing orifices. Such fins are connected at one end to a member through which cooling water passes. The corrosion problem noted above applies both to such fins and hollow tubes. However, it should be readily appreciated that the effects of corrosion on thin wall tubes are much more drastic than on a solid fin. The tubes in question typically have a wall thickness of from 0.005 to 0.010 inch, about the same as from one to two sheets of conventional writing paper. A fin is typically about as thick as the overall width or thickness dimension of the flattened tube, namely, from 0.050 to 0.060 inch. When a portion of the wall of such a tube is eaten away by corrosion effects, water may squirt out on the hot bushing and can cause serious damage. When the top of a fin (of any metal) is eaten away by the same cause, nothing much happens except that the cooling area is reduced. Of course, after a sufficient period of time, even the fins must be replaced to retain cooling efficiency in the precise zone desired.

Platinum has been proposed and used as the fabricating metal for both fins and tubes. Although platinum fins and tubes do not corrode, a deposit collects on them which adversely affects heat transfer capacity. This deposit can easily be removed by washing with plain water. In normal operation, this is done once every seven to ten days. The great drawback to the use of platinum is its high cost, which approximates $1900.00 per pound ($1470.00 per cubic inch). It is greatly desirable to provide a suitable substitute for platinum as the fabricating metal liquid cooled cooling tubes to be used in the virulently corrosive atmosphere closely adjacent the undersides of glass fiber bushings.

An object of the instant invention is to provide liquid cooled tubes to be used in association with heated bushings from which glass fibers are drawn which are formed to the desired minimum total width or thickness, having also the desired thin wall for optimum heat transfer effects and further having complete corrosion resistance, for all practical purposes, under the extreme conditions of temperature and corrosive atmosphere immediately adjacent the heated bushing itself.

Another object of the invention is to provide hollow, liquid carrying cooling tubes of a metal both resistant to corrosion and readily formed or fabricated as a thin wall structure into flattened shape whereby to obtain the maximum heat exchange surface adjacent the fibers being drawn from the glass bushing orifices, said tubes fabricated of palladium metal.

Another object of the invention is to provide flow through cooling tubes of the metal, palladium, which has physical properties adequate and satisfactory for the purposes required which additionally have as long life in service operation adjacent a glass bushing as like tubes of platinum metal, yet which have a total cost of only 15% that of platinum tubes.

Another object of the invention is to provide a basic new use and purpose for the metal palladium in an environment and under conditions where such practical commercial use and usefulness are unexpected and unobvious and wherein a great commercial saving is obtainable.

Other objects of the invention will appear in the course of the following description thereof.

3

In the drawings, which form a part of the instant specification and are to be read in conjunction therewith, an embodiment of the invention is shown and, in the various views, like numerals are employed to indicate like parts.

FIG. 1 is a side view of an array of apparatus incorporating a set of liquid cooled heat transfer tubes and adapted to position same below a bushing containing molten glass adjacent the bushing orifices from which glass fibers are drawn, parts of the apparatus cut away to better illustrate certain details of structure.

FIG. 2 is a top plan view of the apparatus seen in FIG. 1, taken along the line 2—2 of FIG. 1 in the direction of the arrows, a portion of the structure cut away for illustrative purposes.

FIG. 3 is a view taken along the lines 3—3 of FIG 1 in the direction of the arrows.

FIG. 4 is a view taken along the lines 4—4 of FIG. 1 in the direction of the arrows.

Referring to the drawings, at 10 is an input water header or manifold having an input hose connection fitting 10a on the top side thereof. Header 10 has a plurality of output spouts or tubes 11 extending out of one side of the body thereof. Support bars 12 and 13 are fixedly attached to the opposite ends of header 10 and are removably connected at their outer ends to elongate side members 14 and 15.

Opposite input header 10 is output header or manifold 16 which has output hose connection fitting 17 on the underside thereof. Output header 16 has input flow tubes or spouts 18 entering and connected to one side wall thereof. Support bars 19 and 20 are fixed to the opposite ends of header 16 and are removably connected at their outer ends to elongate side support and brace members 14 and 15 in the same manner as the members 12 and 13 on input header 10. Sleeves 21 and 22 are attached to the output tubes 11 of header 10 and input tubes 18 of header 16, respectively. Headers 10 and 16 and input and output tubes 11 and 18 thereof are typically made of stainless steel. Sleeves 21 and 22 are preferably made of a suitable elastomeric substance such as Tygon.

An array of palladium tubes 23, circular in transverse section at the ends thereof and flattened centrally thereof are positioned in parallel orientation between headers 10 and 16, the free ends thereof received in sleeves 21 and 22. Said tubes are generally designated 23 and have, as mentioned, circular cross section free ends 23a and 23b fixedly received in spacer bars 24 and 25. The latter extend at right angles to side members 14 and 15 and are secured thereto by brackets or clips 26 for bar 24 and 27 for bar 25. Bolts 28 extend downwardly from the underside corners of the glass bushing frame, the latter schematically indicated at 29, same extending through slots or openings 26a and 27a, in clips or brackets 26 and 27, respectively. Wing nuts 28a on bolts 28 underlie brackets 26 and 27 and support the header-tube array from the bushing. A series of set or adjustment screws 30 threadbly extend throuhg openings 31 in brackets 26 and 27 and fix the vertical distance of the cooling tube support framework below bushing 29. The view of FIG. 2 shows the flattened portions of the palladium tubes positioned a little further below the orifice nipples 29a of bushing 29 than would generally be the case, as will be later described.

Spacer bars 24 and 25 rigidly grip the round portions 23a and 23b of tubes 23 adjacent the ends thereof whereby to prevent same from turning and also perform the function of precisely spacing them as desired with respect to one another and the bushing orifices. Tubes 23 are typically positioned so that there are two rows of bushing orifices between each tube, but may be so positioned as to have one tube on each side of each row of bushing orifices. It is not desirable to have more than two rows of bushing orifices between each pair of tubes as, then, the central line of fibers being drawn would not have a cooling tube immediately adjacent either side thereof.

4

It has been well established that the use of cooling fins or tubes permits a hotter glass temperature in the bushing with the attendant desired reduced viscosity of the glass. This permits an increase in through-put rate of the bushing. The chilling action of the fins or cooling tubes raises the viscosity of each glass meniscus immediately below the bushing to the point where fiber forming becomes feasible. The desirability of the flow-through cooling tubes over solid cross-section fins has clearly been established in that such possess a much greater cooling efficiency. There has been demonstrated at least a 100% increase in heat pickup. In drawing of glass fibers from bushings under the various conditions of the fiber forming process, there occurs lateral motion and whip of the fibers whereby contact of same with the cooling tubes, or fins, if same are employed, occurs. In a water cooled tube, the relatively low surface temperature eliminates the problem of "wet-out," a condition where the newly emergent glass fiber would adhere to the cooling fin or tube surface. The fiberizing rate is typically increased between solid fins and water cooled tubes by from 8 to 10%, depending on fiber diameter.

Palladium, the metal which I employ for my liquid cooled tubes is not satisfactory in contact with molten glass. It lacks high temperature tensile strength. It thus cannot perform as an effective resistance heater for textile fiberizing glasses, e.g., "E" glass, a calcium borosilicate glass. Thus, palladium cannot be employed in substitution for the under plate of the glass melting bushing 29.

In studying the behavior of solid fin bushing cooling elements, I have observed that the problem of "wet-out" is critical. That is, the problem of the newly emergent glass fibers contacting the said solid cooling elements and adhering thereto. If the fin is hot, then the wet-out problem is critical. Therefore, for a practical and useable solid fin, a cooling device, the use of an efficient heat transfer and conducting metal is required so that the fin itself, in the zone of the bushing orifices, will be continuously maintained at a low enough temperature to avoid wet-out. On a practical basis, I have discovered that silver, copper, and in some cases, aluminum, have sufficient heat conductivity to be employed as the fabricating element for solid fins. However, steel alloys, platinum, and most importantly, palladium, I have found to have insufficient thermal conductivity to warrant the practical, commercial use of same in solid fin form. Thus, for example, at 212° F., platinum and palladium have conductivities of only 0.173 and 0.168 calories per degree centigrade per second, respectively. Further with respect to palladium metal as useable in the construction of solid fin cooling elements, because of the relatively low strength of palladium at elevated temperatures, with its low thermal conductivity, the problem of structural distortion is present.

Palladium, Pd, is chemical element No. 46, a white and very ductile metal which may be worked down cold to thin foil and fine wire. Because of its softness, it is often alloyed with other precious or base metals to increase its hardness and tensile strength. The literature indicates that the most important use of pure palladium is in low current electrical contacts, especially in telephone equipment. Palladium supported on carbon or alumina is used as a catalyst in chemical reactions. Palladium alloyed with ruthenium has the proper hardness for jewelry. It is unique in the number of metals with which it can be alloyed and is noted as generally producing ductile solid solutions. Alloyed with other precious and base metals, palladium is also used for dental purposes and special resistance wires.

The atomic weight of palladium is 106.7. It has a density at 20° C. of 12.00 grams per cubic centimeter. The melting point is 1552° C. A thin oxide surface film is formed on palladium when it is heated in air to 360–800° C. but same decomposes at higher temperatures to leave the metal bright. Palladium in ordinary atmospheres is recited as resistant to tarnish, but will tarnish slightly in outdoor exposures in sulphur-contaminated atmospheres. The literature notes that the metal is readily attacked by nitric acid, ferric chloride, and by moist chlorine, bromine, and iodine. I employ, preferably, commercially pure palladium in my bushing cooling tubes. The common level of purity is 99.85 percent and the minimum commercial limit is 99.5 percent according to the Metals Handbook, 8th ed., American Society for Metals, 1961. As stated in the latter reference, p. 1180, palladium, in contrast to platinum, is not resistant to highly oxidizing chemical environments. It is regarded as being, in general, less resistant to corrosion than platinum. Palladium has a density 0.6 that of platinum and a cost 0.25 per pound that of platinum. Thus, tubes of the character described, formed of palladium, cost only 15% as much as platinum.

No internal cleaning is required, generally speaking, of palladium tubes fabricated according to the specifications to be described. Under certain circumstances, depending upon the source of cooling water, filters may desirably be employed in view of the centrally restricted orifices of the tubes. Thus, the tubes are very substantially cheaper than platinum tubes in initial installation, they are quickly and readily removable for external cleaning, weekly, and may be replaced within 10 minutes. The (presumed fluoride) deposits which build up on the outsides of the tubes may be removed by washing with water. The water flow through the cooling tubes for one bushing of 204 orifices is approximately 1.7 gallons per minute.

As may be seen in the drawings, the flattened central portions of the tubes run vertically. Typically, the upper edge of the tube is positioned from approximately 1/32 of an inch above the lower orifice tip to 3/32 of an inch below same when the bushing is in cold condition. The external vertical height of the typical flattened central portion of a palladium tube is 0.375 inch. A typical central external width or thickness dimension of same is 0.060 inch. A typical side wall thickness of a palladium tube would be 0.010 inch. The round end section outer diameter of the tubes illustrated is typically 0.030. Such a tube would typically be positioned between two lines of orifice nipples on the underside of the bushing, the lines 0.30 inch apart on centers. The nipples themselves are typically sized 0.150 inch at their emergence from the bushing lower surface and 0.112 inch at the lower ends thereof. These values may vary somewhat in different types of bushing construction. This gives a clearance of approximately 0.064 on each side of the palladium tube flattened center section from the bushing orifice nipple walls.

There must be a positive water flow through the tubes, that is, if steam were to be generated therein, the tubes would be distorted. Typically, input water from 55° to 100° F. may be employed and a 3° to 5° F. change in temperature may be expected, at the volume flow-through rate above indicated. The vertical height of the flattened tube portions is limited somewhat by mechanical interference factors in the fiberizing process. With the height of the flattened tube portion of the magnitude described, the width as described and the position of the top edge of the flattened portion as also indicated, the instant tube construction is not obstructive with respect to the fiberizing process. It should be noted, that, in like circumstances, a 0.060 inch thickness solid fin would tend to wet-out unless copper or silver, that is, high conductivity materials, are used. The cost of palladium is approximately $495.00 per pound or $215.00 per cubic inch.

It should be noted that certain other readily available materials, which are generally considered considerably resistant to both corrosion and high temperatures, as well as advantageous from a price standpoint, have proved to be completely inadequate with respect to corrosion resistance. Thus, Monel 400 a (nickel-copper alloy made by International Nickel Company) with an approximate cost of $4.00 per pound and Hastelloy C (a nickel-molybdenum-chromium-iron alloy made by Union Carbide) with an approximate cost of $10.00 per pound were unable to withstand the corrosive atmosphere of the bushing underside. In fact, the latter two materials proved to corrode badly after only a few days of service. These, being low conductivity materials, were tested in tube form.

Thus it is seen that there has been provided cooling means comprising hollow liquid-filled tubes fabricated of palladium metal which will perform all of the desired functions of solid fin bushing orifice coolers utilizing metals of high conductivity, including temperature control adjacent the bushing orifices, reduction of air turbulence therearound and, further, accomplish a marked increase in bushing output over the said solid fin elements. Despite the known poorer corrosion resistance of palladium with respect to platinum, the relative strength deficiency of palladium compared to same, the relatively poor heat conductivity of palladium compared to such metals as silver and copper and the discovered lack of utility of palladium in use as a solid cooling fin, I have been able to demonstrate the utility of said metal in fabrication of and use as bushing cooling elements by employment of same in hollow, liquid-filled tube form. This demonstration is both unexpected and greatly advantageous from a commercial and practical standpoint.

The tubes are formed only centrally flat as the longer the flat section the higher chance of cracks and resultant corrosion. Further, utilizing the resilient sleeve connection to the header, which permits angular adjustment of the tube flats, with respect to one another and also permits the ready replacement of individual tubes, the round end section is far preferable. Removable tubes permit one inventory of tubes for a variety of bushings.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A bushing cooling assembly comprising:
   - a pair of opposed, liquid distributing manifolds each having a plurality of liquid outlets,
   - members rigidly interconnecting the ends of said manifolds and positioning same with respect to one another with the said liquid outlets opposed and in line with one another,
   - a plurality of hollow palladium tubes, centrally flattened, each connecting at the ends thereof with opposed manifold liquid outlets,
   - a resilient elastomeric sleeve fitting over the tube ends and outlet ends to make each latter connection,
   - and a pair of elongate, multi-orificed bar members connected at their opposite ends to the manifold end connecting members and each rigidly gripping and positioning a non-flattened portion of each palladium tube whereby said flattened tube portions may be positioned in desired angular array with respect to one another.

2. A bushing cooling assembly comprising:
   - a pair of opposed, liquid distributing manifolds each having a plurality of liquid outlets thereon, a plurality of hollow palladium tubes, centrally flattened, each connecting at the ends thereof with opposed manifold liquid outlets, resilient elastomeric sleeves making each said latter connection, means rigidly gripping each said palladium tube on each side of the flattened portion thereof and rigidly positioning same with respect to adjacent said tubes and means for fixing said tubes and manifolds in a rigid dimensionally stable array.

References Cited
UNITED STATES PATENTS

| | | | |
|---|---|---|---|
| 2,105,267 | 1/1938 | Robertson | 165—175 |
| 2,580,715 | 1/1952 | Baber | 165—175 |
| 3,001,766 | 9/1961 | Laist | 165—178 |
| 3,334,981 | 8/1967 | Glaser | 65—12 |

ROBERT A. O'LEARY, *Primary Examiner.*

CHARLES SUKALO, *Examiner.*